HERMANN SCHMID
INVENTOR
BY Richard D. Stephens
ATTORNEY

May 4, 1965

H. SCHMID 3,182,240

DIGITAL COMPARATOR

Filed Jan. 9, 1962

2 Sheets-Sheet 2

HERMANN SCHMID
INVENTOR

BY Richard G. Stephens
ATTORNEY

United States Patent Office 3,182,240
Patented May 4, 1965

3,182,240
DIGITAL COMPARATOR

Hermann Schmid, Binghamton, N.Y., assignor to Link Division of General Precision, Inc., Binghamton, N.Y., a corporation of Delaware Filed Jan. 9, 1962, Ser. No. 165,140
15 Claims. (Cl. 318—28)

In automatic control, computation and instrumentation, it is frequently necessary or desirable to compare two digital signals to determine which, if either, is greater than the other, and a variety of systems heretofore have been provided for performing such functions, the device shown in U.S. Patents Nos. 2,844,309 and 2,885,655 being typical. When one compares two digital numbers, whether they are binary or binary coded decimal, it is necessary to inspect or compare most significant digits before less significant digits, or else the sign of the difference can change as successive comparisons are made, and the sign of the difference would not be known certainly until all digits have been compared. If such a difference signal were used to drive a motor, for example, the motor undesirably might be reversed a number of times while successive higher orders of digits were being compard, unless it waited until the comparison were finished, so that the digital servo might be very slow in arriving at a steady-state position after a multi-digit command signal were applied to it.

The present invention, while being simpler and more economical, also has the important advantage that all three possible output signals are provided in ternary fashion, on a single output line. This latter advantage is particularly important and useful for digital comparison within digital servo loops, where the difference between a digital command signal and a digital feedback signal is used to drive a digital motive means in a direction dependent upon the sign of the difference, because many digital motive means are analog types of devices, whose direction of operation can be controlled by an analog type of signal. A central concept surrounding the present invention is that great circuit simplification may be achieved if a digital comparator which will provide correct digital signals during comparisons resulting in equality also can be made to provide a signal which is correct in an analog sense for comparisons resulting in equality.

Thus it is a primary object of the present invention to provide an improved digital comparator, which will compare two digital signals and provide an output signal indication of which, if either is larger and which will provide an output signal which is correct in an analog sense when neither of the two input signals exceds the other. It is further object of the invention to provide digital closed-loop systems which utilize such comparators.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
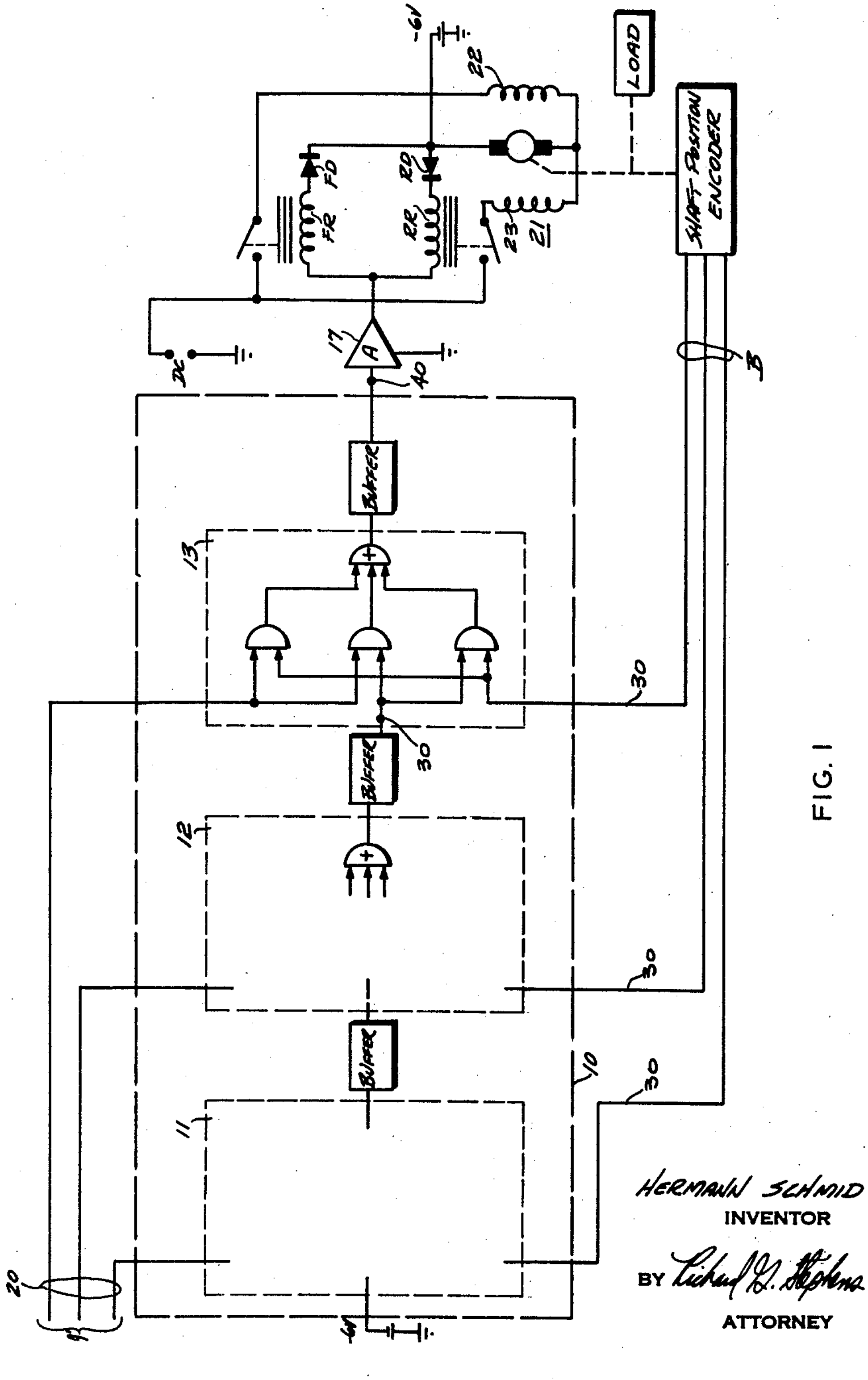
FIG. 1 is an electrical block diagram, partially in schematic form, of a digital servomechanism which utilizes the improved comparator.

The comparator is shown in FIG. 1 utilized as the comparator, or error indicator, of a digital position servomechanism. The comparator 10 is shown as comprising $n$ stages, only three of which are shown in FIG. 1 at 11, 12 and 13. The digital servo command, or input, signal A is applied in inverse form (as $\bar{A}$) via $n$ input lines 20, 20, and the servo position feedback signal B is applied via $n$ lines 30, 30. The comparator output signal, usually termed the servo "error" signal, which is commensurate with the instantaneous difference between the command signal and the feedback signal, and which is taken on a single line 40 from the most significant digit stage 13, is applied (via buffering and power amplifying, if desired) to operate digital servo motor 21 in a direction which depends upon the sense of the comparator output or error signal. The motor moves a desired load and simultaneously operates a shaft position encoder of conventional type, continuing to operate the encoder until feedback signal B on lines 30, 30 equals command signal A, at which time the comparator 10 output signal, i.e., the servo error signal, becomes effectively zero, and the motor stops.

The motor control circuit shown in FIG. 1 is merely exemplary and while it is suitable for the purpose of simple illustration of the invention, a variety of alternative motor drive systems may be substituted. As shown in FIG. 1, the difference or error signal from comparator 10 is amplified in amplifier 17 and applied across two relay coils FR and RR, which are connected to ground via oppositely-poled diodes FD and RD. If the comparator output signal is of one polarity with respect to −6 volts, relay coil FR will become energized, closing its contact, so that voltage will be applied to reversible motor 21 via its "forward" field 22, and the motor will run in its forward direction. If the comparator output signal is of opposite polarity, relay coil RR will become energized, closing its contact, so that motor 21 will be energized through its "reverse" field winding to run in its reverse direction. If the comparator 10 output signal is effectively zero, which in the embodiment illustrated in FIG. 1, is −6 volts, however, neither relay will close and the motor will not run. The relays may be replaced with oppositely-poled diodes when the motor load is light.

Figure 2:
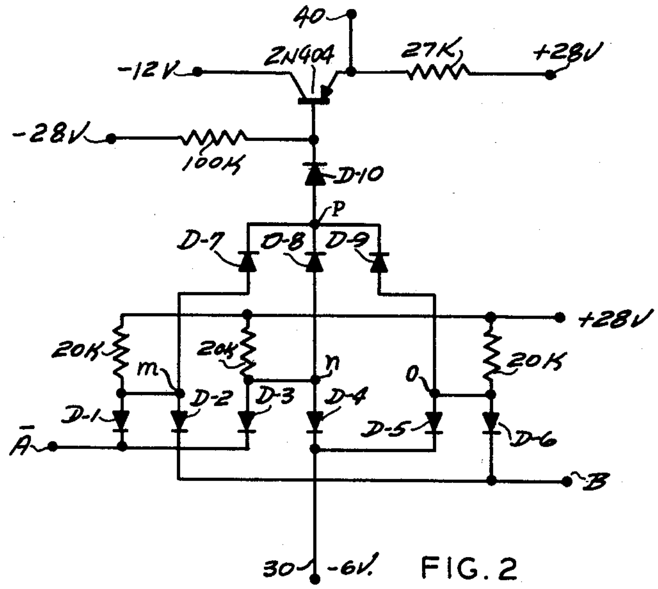
FIG. 2 is a schematic diagram of one stage of an exemplary comparator constructed in accordance with the invention.

Each of the stages of the comparator may be seen in FIG. 2 to include three "and" gates and one "or" gate. In comparing binary digits of a given order, it will be understood that three possible conditions can exist: (1) the command number digit may be larger than the feedback number digit; (2) the command number digit may be smaller than the feedback number digit; and (3) the digits of both numbers may be the same. Condition (3) could, of course, exist whenever both digits were "1" or whenever both digits were "0." Each stage of the comparator, therefore, has been arranged to provide an analog voltage of one sense when its associated command digit exceeds its associated feedback signal digit, an analog voltage of opposite sense when its associated feedback signal digit exceeds its associated command signal digit, and a voltage, determined solely by the value of C, when the two applied digits are equal. From the equivalent logic circuit of FIG. 2 one can write the following Boolean truth table, wherein A and B each represent one digit of each of the two numbers to be compared, C represents the "carry" from the preceding lower order stage, and Z represents the output.

| | A | B | C | Z |
|---|---|---|---|---|
| A=B | 0 | 0 | 0 | 0 |
| | 0 | 0 | 1 | 1 |
| B>A | 0 | 1 | 0 | 1 |
| | 0 | 1 | 1 | 1 |
| A>B | 1 | 0 | 0 | 0 |
| | 1 | 0 | 1 | 0 |
| A=B | 1 | 1 | 0 | 0 |
| | 1 | 1 | 1 | 1 |

From the first line of the truth table it will be seen that Z will be "0" if A, B and C all are "0," and from the second line that Z will be "1" if A and B both are equal at "0" but that a carry C exists from a preceding stage. Thus the Boolean equation for the circuit of a stage may be written, as follows:

$$Z=\overline{AB}C+\bar{A}B\bar{C}+\bar{A}BC+ABC \quad (1)$$

Equation 1 can be manipulated into the following two different forms:

$$Z=\bar{A}B+C(\overline{AB}+AB) \quad (2)$$

$$Z=\bar{A}B+BC+\bar{A}C \quad (3)$$

From Equations 2 and 3 it may be recognized that Z is directly proportional to C when A equals B. Therefore the circuit has three output levels, with the intermediate level corresponding to equality of the two input digits being compared.

In FIG. 1 wherein the $n$ stages are cascaded to provide an $n$-digit comparator, the output from each lower order single-digit stage is connected as the input signal to the adjacent higher-order stage. No carry input signal is applied, of course, to the lowest order stage.

Carry input terminal C of the lowest order stage is shown connected to −6 volts, a reference potential. When all digits of an applied number A are equal to those of an applied number B, the ground −6 volts potential will be transmitted through all of the cascaded stages to output terminal 40.

In the specific comparator stage shown in FIG. 2, the binary signals "0" and "1" are represented by 0 volts and −12 volts, respectively. The output signal is 0 volts (±2 volts) when A is greater than B, it is −12±2 volts when B is greater than A, and it is −5 volts±.5 volt when A equals B. The output signal is provided from an emitter follower.

For a better understanding of this portion of the invention, the following examples are discussed in detail. Consider first the case where A and B are equal, each having the value 0. Under these conditions, the comparator has the following inputs: −12 volts at $\bar{A}$, it being remembered that the inverse of the digital number A is applied to the comparaor, 0 volts at B, and −6 volts at C along line 30. Thus, diode D–1 clamps point $m$, the common output of diodes D–1 and D–2, at −12 volts, the most negative input applied to this "and" circuit, diode D–3 clamps point $n$ also at −12 volts, and diode D–5 clamps point 0 at −6 volts. The potentials at points $m$, $n$, and 0 are next applied to diodes D–7, D–8, and D–9, respectively, each of which is oppositely poled with respect to diodes D–1 through D–7. Diodes D–7 through D–9 then operate to clamp point $p$, their common output, to the most positive potential applied to either of them, which, in the present example is −6 volts, through the action of diode D–9.

Continuing, with A still equal to B, but each now having the value 1, the comparator has the following inputs: $\bar{A}$ equal to 0 volts, B equal to −12 volts, and C equal to −6 volts. Under these conditions, point $m$ is clamped to −12 volts by diode D–2, point $n$ is clamped to −6 volts by diode D–4, and point 0 is clamped to—12 volts by diode D–6. Again, now by the action of diode D–8, point $p$ is clamped to −6 volts. Therefore, when A and B are equal in binary value, the potential of C, applied along line 30, is coupled to output terminal 40. Further note should also be made of the fact that, should C have a value of either 0 or −12 volts, as a result of $\bar{A}_1$, and $B_1$, by way of example, applied to a previous comparator stage being unequal, this value of C will be coupled to terminal 40, provided only that $\bar{A}$ and B are equal. This results for the reason that when A is equal to B, $\bar{A}$ and B are necessarily unequal. Thus, should C have a value of −12 volts, the output of all three "and" circuits is −12 volts, and should C have a value of 0 volts, the output of either the "and" circuit consisting of diodes D–3 and D–4, or D–5 and D–6, will be at 0 volts. The operation of the circuit shown in FIG. 2 is summarized in the following table:

| Condition | $\bar{A}$ | B | C | $m$ | $n$ | $o$ | $p$ |
|---|---|---|---|---|---|---|---|
| A=B=0 | −12 | 0 | −6 | −12 | −12 | −6 | −6 |
| A=B=1 | 0 | −12 | −6 | −12 | −6 | −12 | −6 |
| A>B | 0 | 0 | −6 | 0 | −6 | −6 | 0 |
| A<B | −12 | −12 | −6 | −12 | −12 | −12 | −12 |

Further information concerning elementary circuits of these types may be found at lines 19 through 25 on page 33 of Arithmetic Operations in Digital Computers, by R. K. Richards, published in 1955 by D. Van Nostrand Company, Inc. All the diodes shown in FIG. 2 were type IN270. While specific circuit valves and operating levels are provided in FIG. 2, these are solely exemplary.

The circuit voltage drops must be considered. Assuming that the A signal exceeds the B signal, that there is a 300 mv. drop across diode D–1, −100 mv. drop across diode D–7, −100 mv. drop across diode D–10 and that the base-emitter drop of transistor T–1 is 150 mv., the total drop across a single stage will be seen to be 250 millivolts. Now assuming instead that B exceeds A, the same four individual voltage drops will be 200 mv., −200 mv., −200 mv. and 50 mv., so that the total voltage drop across a single stage will be −150 mv.

Considering now the situation where the A signal equals the B signal, it may be noted initially that diodes D–5 and D–9 will switch the carried-in signal at terminal 30 to the output terminal 40 when A and B are both "0" and that diodes D–4 and D–8 will do the switching when A and B both are "1." When the carry input voltage applied to a stage is −12 volts, the total drop is, as mentioned above, 250 mv., and when the input is zero volts the maximum voltage drop is −150 mv. When the input is −5 volts the total drop across a stage is somewhat less than 100 mv. If a large number of stages are cascaded, the output voltage from the most significant stage, which should be −12 v., −6 volts or 0 volts, may depart from those nominal values by an appreciable amount. In the event that the departure from the nominal values becomes too great when it is desired to cascade a large number of stages, a level resolving device may be inserted after $m$ stages, where $m$ is so selected that the maximum permissible departure from the nominal values is not exceeded in $m$ stages. Such a level resolving device is shown in FIG. 3.

Figure 3:
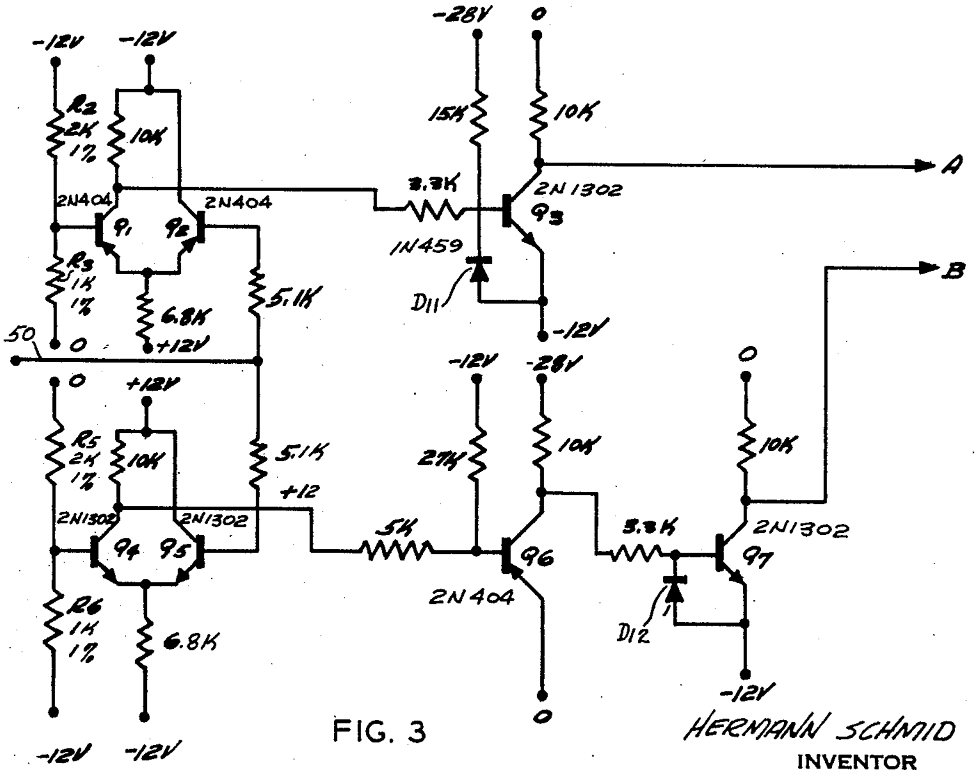
FIG. 3 shows a level resolving device constructed in accordance with the invention.

The level resolving device of FIG. 3 will be seen to comprise basically two transistor amplifiers, one consisting of $Q_1$, $Q_2$, $Q_3$, and the other consisting of $Q_4$, $Q_5$, $Q_6$, and $Q_7$. The bases of $Q_1$ and $Q_4$ are connected to appropriate bias levels, representing the upper and lower threshold voltages, respectively. The input signal from previous stage $m$ is connected through level resolver input terminal 50 to the bases of $Q_2$ and $Q_5$, which operate as emitter followers and which in turn drive the emitters of $Q_1$ and $Q_4$, respectively. The other three stages of amplification $Q_3$ $Q_6$, and $Q_7$, are of conventional pattern, the lower chain of amplifiers having one additional stage to produce phase inversion. It will be apparent that diodes D–11 and D–12 have been inserted to preserve transistors $Q_3$ and $Q_6$ against excessive biases from the −28 volt points associated therewith. When the input signal applied along line 50 is at a level of −6 volts, by way of example, transistors $Q_1$ and $Q_4$ are cut off. $Q_4$ in the OFF condition applies a relatively positive signal to the base of transistor $Q_6$ maintaining it also in the cut off state. The negative potential on the collector of transistor $Q_7$ then operates to maintain transistor $Q_7$ cut off; the 0 volt potential on its collector being applied to the B output terminal. In like manner, $Q_1$ in the OFF condition applies a negative signal to the base of transistor $Q_6$ maintaining it also in the cut off state; the 0 volt potential on the collector of transistor $Q_3$ being applied to the A output terminal. However, when the potential on line 50 becomes more negative than −8 volts, transistor $Q_4$ conducts, resulting in transistors $Q_6$ and $Q_7$ also conducting thereby applying −12 volts to output B. Alternatively, when potential on line 50 becomes more positive than −4 volts, transistor $Q_1$ conducts, and results in transistor $Q_2$ conducting and applying −12 volts to output A. In operation, when and only when, the input signal at terminal 50 exceeds the −8 volt lower threshold in the negative sense an output of −12 volts is produced at terminal B. On the other hand, when, and only when, the input signal at terminal 50 is more positive than the upper threshold of −4 volts an output of −12 volts is produced at terminal A. If the input at terminal 50 exceeds neither threshold, i.e., if it remains within the limits −4 volts and −8 volts, neither output terminal A nor output terminal B will produce a −12 volt output signal.

In order to convert the output signals at terminals A and B to a resolved, or corrected, three level signal on a single lead a single stage circuit identical to FIG. 2 is used. The signals from terminals A and B are applied to terminals $\bar{A}$ and B of the single conversion stage, and the output from terminal 30 of the single conversion stage is then connected to the center input of the next regular comparator stage $m+1$.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A digital comparator stage comprising: a first input terminal connected to the cathodes of a first plurality of input diodes, a second input terminal connected to the cathodes of a second plurality of input diodes, a third input terminal connected to the cathodes of a third plurality of input diodes, means connecting first and second signal sources to said first and second input terminals to provide binary signals of first and second potentials representative of a binary 1 and a binary 0, respectively, means connecting a source of potential having a magnitude intermediate said first and second potentials to said third input terminal, means connecting the plates of all of said plurality of diodes through resistors to a first common source of supply voltage having a magnitude greater than either of said first and second potentials, means connecting the plates of one of the diodes of said first and second pluralities, one of the plates of the diodes of said first and third plurality and one of the plates of the diodes of said second and third plurality to the plates of respective ones of a fourth plurality of diodes, means connecting the cathodes of the diodes of said fourth plurality through a further resistor to a second common source of supply voltage having a magnitude less than either of said first and second potentials, and means coupling an output terminal to the cathodes of the diodes of said fourth potential.

2. A circuit for the comparison of two sets of digital input voltages which represent a first number and a second number, comprising: a plurality of comparator stages each having a first input terminal connected to the inputs of a first "and" circuit and a second "and" circuit, a second input terminal connected to the inputs of said second "and" circuit and a third "and" circuit, a third input terminal connected to the inputs of said first and third "and" circuits, means connecting the outputs of said "and" circuits to the input of an "or" circuit, and an output terminal connected to the output of said "or" circuit, the output terminals of successive ones of said stages being connected to the second input terminals of the stage next following, the first input terminals of said stages being energized by the digital input voltages representing said first number, the third input terminals of said stages being energized by the digital input voltages representing said second number, and the output terminal of the stage corresponding to the most significant digit of said numbers producing a ternary signal having a first value when said first number equals said second number, a second value when said first number exceeds said second number, and a third value when said second number exceeds said first number when the second input terminal of the stage corresponding to the most significant digit of said numbers is connected to a signal having said first value.

3. In a digital servo system for operation in response to a digital command signal including a servo motor, an output shaft, and means driven by said motor for producing a digital feedback signal indicative of the operation of said motor, the improvement comprising: comparator means for comparing said command signal with said feedback signal and producing a three-level analog error signal for driving said servo motor, said comparator means comprising a plurality of comparator stages each of which includes three "and" circuits the outputs of which are applied to the input of an "or" circuit and the inputs of which are derived from the output of the previous stage and the digital command and feedback signals.

4. In a digital servo system responsive to digital command signals and including output monitoring means producing digital feedback signals an error indicator comprising: a plurality of stages each having a first input terminal connected to the inputs of a first "and" circuit and a second "and" circuit, a second input terminal connected to the input of said second "and" circuit and a third "and" circuit, a third input terminal connected to the inputs of said first and third "and" circuits, means connecting the outputs of said "and" circuits to the inputs of an "or" circuit, and an output terminal connected to the output of said or circuit, the output terminals of successive ones of said stages being connected to the second input terminals of the stage next following, the first input terminals of said stages being energized by said digital command signals, the third input terminals of said stages being energized by said digital feedback signals, and the output terminal of the stage energized by the most significant digit signals of said command signals and said feedback signals producing an analog error signal having a first value when said command signal equals said feedback signal, a second value when said command signal exceeds said feedback signal, and a third value when said feedback signal exceeds said command signal.

5. A circuit for the comparison of two sets of digital input voltages which represent a first and a second number respectively, comprising: a plurality of comparator stages each having a pair of input leads adapted to receive the voltages from each of said sets which correspond to the digits of each of said numbers having the same order of significance, and an output lead, the output lead from the stage corresponding to the most significant digit of said numbers producing a ternary signal having a first value when said numbers are equal, a second value when said first number is greater than said second number, and a third value when said second number is greater than said first number only when the second input terminal of the stage corresponding to the most significant digit is connected to a signal of said first value.

6. In a digital servo system for operation in response to a digital command signal including a servo motor, an output shaft, and means driven by said motor for producing a digital feedback signal indicative of the operation of said motor, the improvement comprising: comparator means for comparing said command signal with said feedback signal and producing a three-level analog error signal for driving said servo motor, said comparator means comprising a plurality of comparator stages each of which includes three "and" circuits the outputs of which are applied to the input of an "or" circuit and the inputs of which are derived from the output at the previous stage and the digital command and feedback signals, and the output terminal of the comparator stage corresponding to the most significant digit of said numbers producing a ternary signal having a first value when first and second numbers are equal, a second value when said first number exceeds said second number, and a third value when said second number exceeds said first number.

7. A digital comparator circuit, comprising: a first plurality of input terminals adapted to be energized by first pluralities of digital signals corresponding to first numbers, a second plurality of input terminals adapted to be energized by second pluralities of digital signals corresponding to second numbers, an output terminal producing ternary signals having a first value when the numbers applied to said first and second pluralities of input terminals are equal, a second value when the number applied to said first plurality of terminals exceeds the number applied to said second plurality of terminals, and a third value when the number applied to said second plurality of terminals exceeds the number applied to said first plurality of terminals, a further input terminal, means connecting said further input terminal in parallel with the ones of said first and second plurality of input terminals energized by the most significant bits of said digital signals, and means coupling a signal of said first value to said further input terminal.

8. A digital comparator comprising, (a) first, second, and third input terminals and an output terminal;

(b) first and second sources of binary values, each of said sources providing binary signals wherein the most positive excursion of each of said signals is representative of a binary 0 and the most negative excursion of each of said signals is representative of a binary 1;

(c) first circuit means coupling the inverse of each of said signals from said first source to said first input terminal and directly coupling each of said signals from said second source to said second input terminal;

(d) a source of constant potential having a magnitude midway between said most positive and most negative excursions coupled to said third input terminal;

(e) logical circuit means including first, second and third "and" circuits, each of said "and" circuits having a pair of inputs coupled to different pairs of said first, second, and third input terminals and operable to provide an output signal representative of the most negative excursion applied to said pair of inputs, and an "or" circuit having inputs coupled to each of said "and" circuit output signals and operable to provide a further output signal representative of the most positive excursion applied to said "or" circuit inputs; and (f) said further output signal providing a ternary valued signal indicative of equality between said first and second sources of binary values as well as which of said values is greater, if any.

9. In a digital comparator including three "and" circuits the outputs of which are connected in parallel to an "or" circuit, first and second digital signals having first and second potentials representative of the binary value thereof, a third digital signal having said first and second potentials and a third potential intermediate said first and second potentials, and means connecting different combinations of two of said signals to each of said "and" circuits, the improvement consisting of, (a) a first voltage source coupled to said "and" circuits, said first voltage source having a value which exceeds in magnitude and is of the same sign as the value of one of said first and second potentials and effective to cause the output of each of said "and" circuits to be determined by the connected one of said signals, if any, nearest in value to the other of said first and second potentials; and (b) a second voltage source coupled to said "or" circuit, said second voltage source having a value which exceeds in magnitude and is of the same sign as the value of said other of said first and second potentials and effective to cause the output of said "or" circuit to be determined by said output of the one of said "and" circuits, if any, nearest in value to said one of said first and second potentials.

10. In a digital comparator including three "and" circuits the outputs of which are connected in parallel to an "or" circuit, first and second digital signals having first and second potentials representative of the binary value thereof, a third digital signal having said first and second potentials and a third potential intermediate said first and second potentials, and means connecting different combinations of two of said signals to each of said "and" circuits, the improvement consisting of (a) the output of each of said "and" circuits being equal to a common digital signal applied to the inputs thereof and being equal to a selected one of said potentials when different digital signals are applied thereto; and (b) the output of said "or" circuit being equal to a common digital signal applied to the inputs thereof and being equal to a selected other one of said potentials when different potentials are applied thereto.

11. The comparator of claim 10 wherein said selected one of said potentials is the most negative of said first, second, and third potentials, and said selected other of said potentials is the most positive of said first, second, and third potentials.

12. The comparator of claim 10 wherein said selected one of said potentials is the most positive of said first, second, and third potentials, and said selected other of said potentials is the most negative of said first, second, and third potentials.

13. The comparator of claim 10 including, (a) a first voltage source coupled to all of said "and" circuits having a magnitude in excess of any of said first, second, and third potentials; and (b) a second voltage source coupled to said "or" circuit having a magnitude less than any of said first, second, and third potentials.

14. The comparator of claim 10 including, (a) a first voltage source coupled to all of said "and" circuits having a magnitude less than any of said first, second, and third potentials; and (b) a second voltage source coupled to said "or" circuit having a magnitude in excess of any of said first, second, and third potentials.

15. A digital comparator stage comprising;

(a) three "and" circuits and an "or" circuit;

(b) a first input terminal, a second input terminal, and a third input terminal;

(c) means connecting said first input terminal to inputs of a first and a second of said "and" circuits, means connecting said second input terminal to an input of said second "and" circuit and to the input of the third of said "and" circuits, means connecting said third input terminal to inputs of said first and third "and" circuits;

(d) means connecting the outputs of said "and" circuits to the input of said "or" circuit;

(e) a first voltage source coupled to said three "and" circuits having a magnitude less than any potential applied to said first, second, and third input terminals; and (f) a second voltage source coupled to said "or" circuit having a magnitude in excess of any potential applied to said first, second, and third input terminals.

References Cited by the Examiner

UNITED STATES PATENTS

| | | | |
|---|---|---|---|
| 2,781,968 | 2/57 | Chenus | 340—146.2 |
| 2,860,294 | 11/58 | Steele | 318—28 |
| 2,900,620 | 8/59 | Johnson | 340—146.2 |
| 2,907,877 | 10/59 | Johnson | 235—177 |
| 3,011,150 | 11/61 | Ketchledge | 340—146.2 |
| 3,027,465 | 3/62 | Di Lorenzo | 207—88.5 |
| 3,032,268 | 5/62 | Lucas et al. | 318—28 |
| 3,045,157 | 7/62 | Jacquet et al. | 318—28 |
| 3,098,995 | 7/63 | Mundt | 340—141.2 |

JOHN F. COUCH, *Primary Examiner.*